Aug. 26, 1969  D. JEAVONS  3,463,286
PRESS WITH ADJUSTABLE BRAKE CAM TO COMPENSATE
FOR CHANGE IN STROKE
Filed Dec. 6, 1967  3 Sheets-Sheet 1

United States Patent Office 3,463,286
Patented Aug. 26, 1969

3,463,286
PRESS WITH ADJUSTABLE BRAKE CAM TO COMPENSATE FOR CHANGE IN STROKE
Daniel Jeavons, Coseley, near Bilston, England, assignor to Taylor & Challen Limited, Birmingham, England, a British company
Filed Dec. 6, 1967, Ser. No. 688,469
Claims priority, application Great Britain, Dec. 6, 1966, 54,505/66, 54,506/66
Int. Cl. F16d 7/00, 9/00, 67/00
U.S. Cl. 192—134   8 Claims

ABSTRACT OF THE DISCLOSURE

In a mechanical press with a double eccentric arrangement for adjusting the stroke and with a safety brake operated by a cam on the crankshaft and coming into action if the press over-runs top dead centre or reverse-runs, the cam is angularly adjustable to allow for the alterations in top dead centre position caused by altering the stroke. Where there is a pawl serving to prevent reverse-running a fluid cylinder can be energised to hold this out of the way to allow release of the brake by reversing the motor after emergency application of the brake.

---

This invention relates to safety equipment in power-driven presses. We have previously proposed in our British patent specification No. 716,151 an arrangement in which a guard on a press can be opened by the operator during the upward or return stroke of the ram or slide of the press but in which, if while the guard is open the crankshaft of the press should over-run, i.e. should pass beyond top dead centre or if it should become reversed in direction then the movement will be braked. This is achieved by a cam which rotates in synchronism with the crankshaft and has surfaces which, when members influenced by the opening of the guard are moved directly or indirectly into the path of the cam surfaces, engage those members and apply the brake.

Where the press is of the type in which the stroke is adjustable, this adjustability is achieved in one known arrangement by the use of a form of adjustable eccentric; to alter the stroke the outer eccentric is turned with respect to the inner one. However this not only alters the effective throw of the eccentric and hence the stroke of the press, but also at the same time it alters the timing of the stroke in relation to the rotation of the crankshaft so that top dead centre of the stroke occurs at a different angular position of the crankshaft. Consequently it upsets the timing of the safety device described above.

Another drawback of such a safety device is that, it has operated and the cam has applied the brake, it is self-locking in that the brake itself is then acting to resist the reverse rotation of the cam necessary to release the brake, and considerable force is required.

Aims of the invention are to overcome these and other drawbacks, and also to provide a safety device linkage which is simple and compact and is reliable in operation.

According to the invention, in a power-driven mechanically operated press having a stroke which is adjustable by means of a double eccentric or equivalent device and having provisions for braking the crankshaft of the press if the press over-runs or reverse-runs with its guard in the open position, these provisions including a cam synchronised with the rotation of the crankshaft, the timing of his cam with respect to the crankshaft is made adjustable. In this way changes in the timing of top dead centre of the ram or slide in relation to the angular position of the crankshaft resulting from adjustment of the stroke of the press can be balanced or compensated by changing the timing of the cam, so that the cam remains substantially in step with the ram or slide and those surfaces of the cam which initiate braking of the crankshaft or over-running or reverse-running come into action substantially as soon as the ram or slide starts to move downwards, regardless of whether the press is adjusted to give a long stroke or a short stroke.

Further features of the invention will become apparent from the following description of an example of a press embodying these features, in conjunction with the accompanying drawings, in which.

Figure 1:
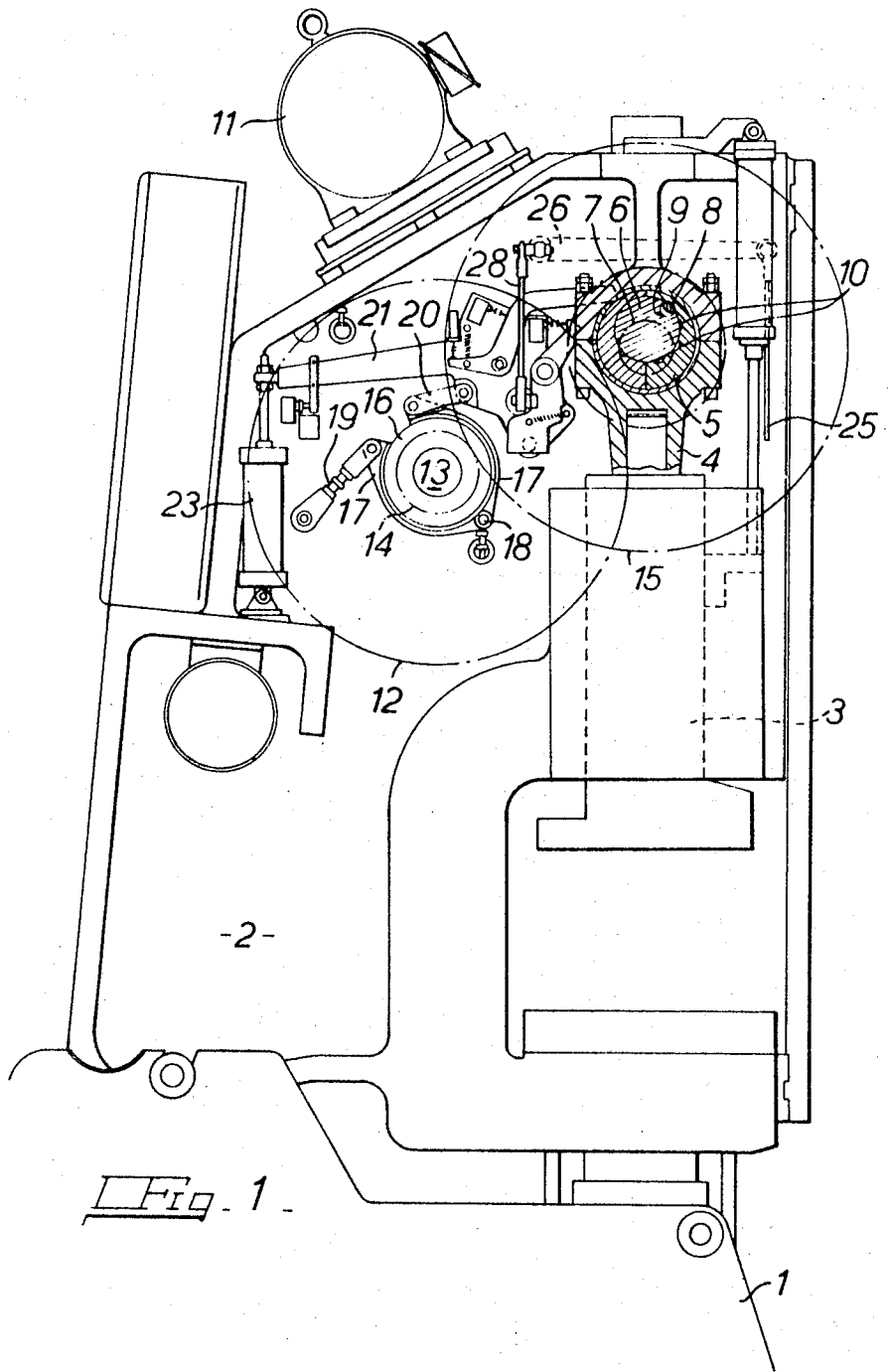
FIGURE 1 is a side elevation of the upper part of the press with one side frame removed and with the crankshaft sectioned to show the double-eccentric stroke adjusting arrangement.

Referring first to FIGURE 1 the press comprises a base 1 and a frame 2 in which a ram or slide 3 moves vertically under the action of a connecting rod 4. The big end of this connecting rod fits over a double eccentric arrangement comprising an outer eccentric 5 which is itself mounted on an inner eccentric 6 that forms the crankpin in the press and is intergral with the crankshaft, indicated by the chain-dotted circle 7. As will be well understood, when the direction of the eccentricity of the outer eccentric 5 is the same as that of the inner eccentric or crankpin 6 the throw of the eccentric, and therefore the stroke of the slide 3, will be a maximum, whereas when the outer eccentric is turned through 180° with respect to the crankpin so that there directions of eccentricity are mutually opposed, the stroke will be a minimum. The outer eccentric is locked to the crankpin by an axially extending pin 8 of roughly D-shaped cross-section which is received in a notch 9 in the crankpin and in any one of five angularly spaced notches 10 in the outer eccentric 5. To alter the stroke of the press the pin 8 is turned through 180°, the outer eccentric is adjusted until a different notch 10 is aligned with the pin, and the pin is returned to its locked position. It is to be noted that, when the stroke of the press is adjusted in this manner the timing of the position of top dead centre in the stroke of the press, determined by vectorial addition of the two eccentricities is altered with respect to the angular position of the crankshaft 7.

The press is driven in the present example by the electric motor 11 which is connected by V-belts, not shown, to a large diameter pulley indicated by the chain-dotted circle 12 on a layshaft 13 which rotates in a counter-clockwise direction. A small pinion 14 on this shaft meshes with a large gearwheel 15 on the crankshaft.

The layshaft 13 also carries a brake drum 16 embraced by a pair of external shoes 17 joined together by a floating pivot 18. One end of one shoe engages a fixed abutment through a link 19 of adjustable length and the free end of the other shoe is acted on by a toggle linkage formed by a short link 20 and part of a long lever 21 which is pivoted to the frame of the press at 22. The free end of the lever 21 is engaged by a pneumatic piston-and-cylinder assembly 23, which is used for normal braking. It will be appreciated that when air is admitted to the cylinder 23 to pull the end of the lever downwards the toggle linkage will be straightened bringing the brake shoes 17 together around the drum 16. The floating arrangement of the pivot 18 ensures a self-servo action which together with the force-multiplying effect of the toggle linkage, ensures that the brake is applied with considerable force. The rest position of the pivot 18 is controlled by an adjustable stop 24.

Figure 2:
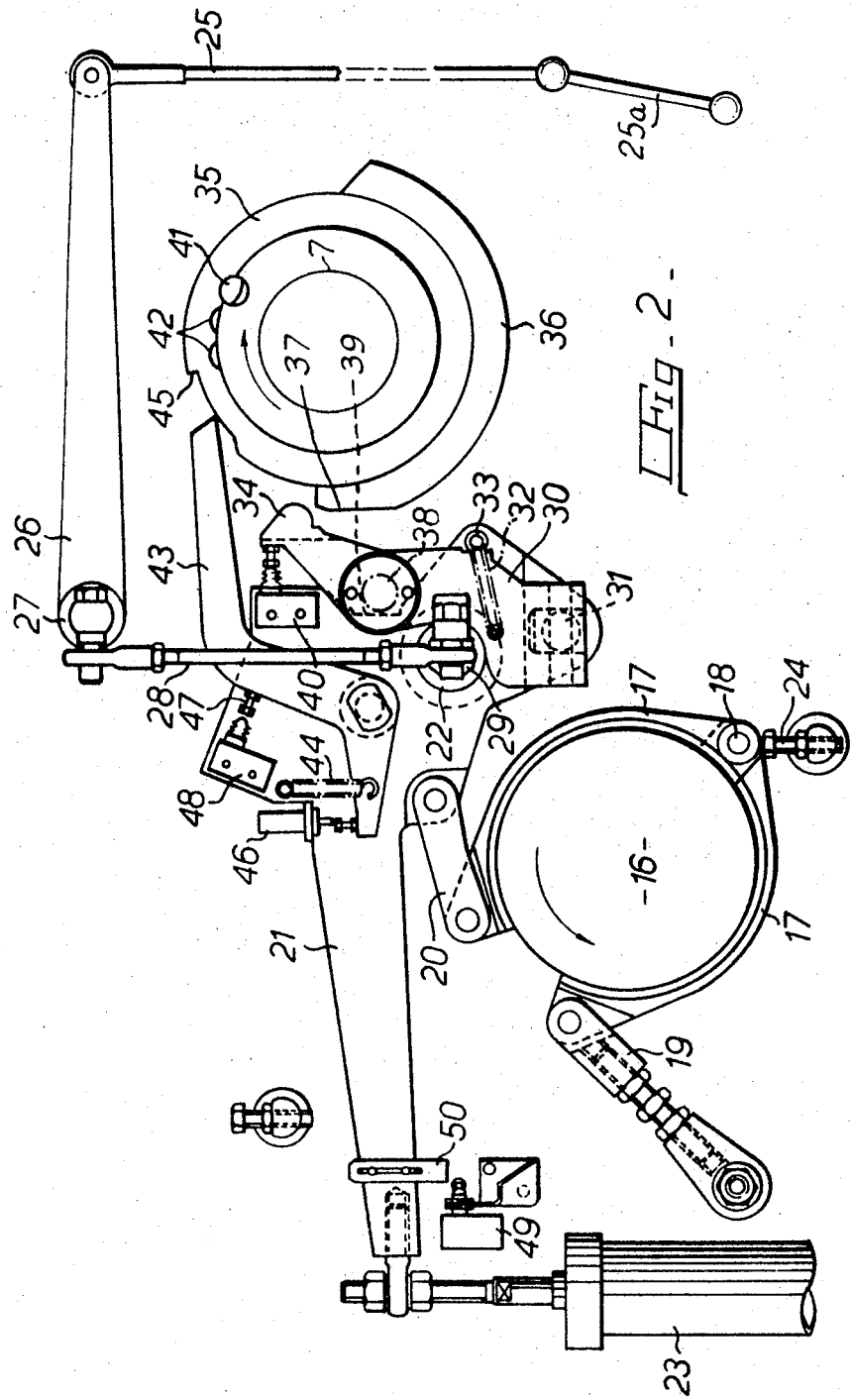
FIGURE 2 is a view to a larger scale than that of FIGURE 1 and showing the cam and operating linkage of the safety device.
Figure 3:
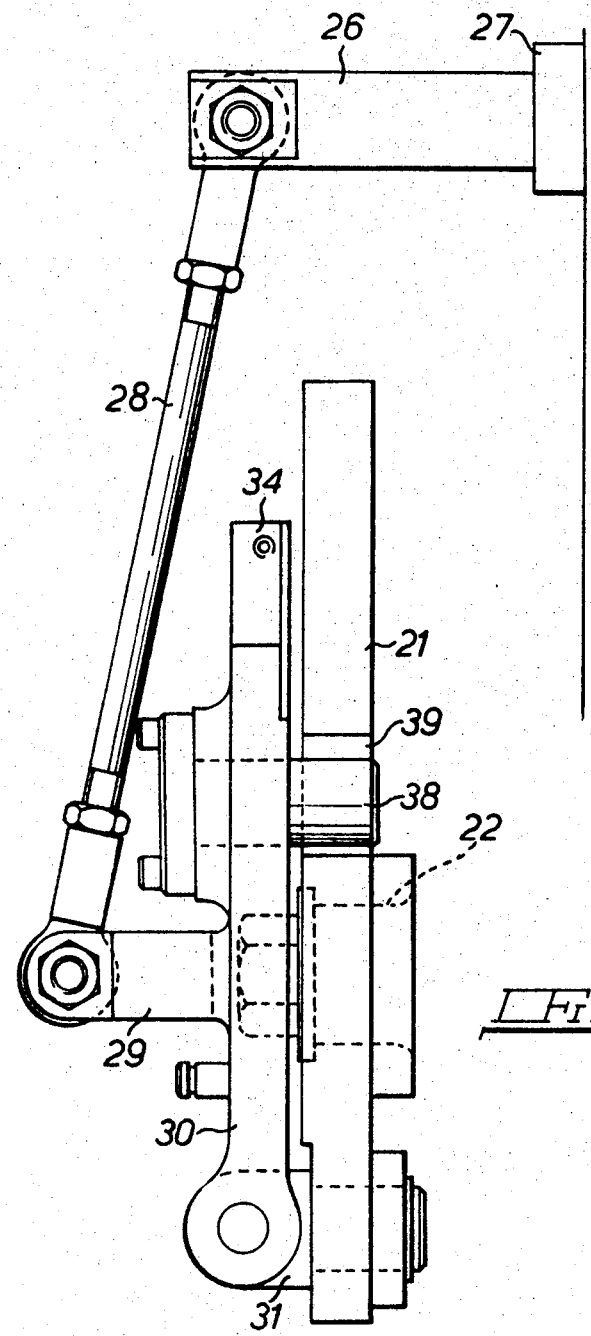
FIGURE 3 is a front elevation, to a still larger scale, of part of the linkage.

We will now describe the safety device that brings the brake into action in the event of faulty operation of the press while the guard 25a is open. When guard 25a is open it pulls down a rod 25 and when it is closed it raises that rod. Through a two-armed lever arrangement 26, pivoting about a mounting 27, this movement is inverted and transmitted on a reduced scale to a rod 28. The lower end of the rod 28 is pivotally connected to a bracket 29 (see FIGURE 3) projecting from a flap 30 that is pivoted about a substantially horizontal axis on a pin 31 that in its turn can pivot on a lower portion of the lever 21 about a horizontal axis perpendicular to the plane of the lever. A spring 32 normally urges the flap clockwise as viewed in FIGURES 1 and 2, holding it against a stop 33 that forms the attachment point for one end of the spring.

On the upper end of the flap 30 there is a cam follower 34 of which the nose is placed to be capable of moving into the path of a cam 35 mounted on the crankshaft 7 of the press, which rotates in a clockwise direction. When the guard is closed the rod 28 is urged downwards and this causes the flap 30 complete with the pawl 34 to swing in a counter-clockwise direction (as viewed in FIGURE 3) so that the pawl is out of the path of the cam 35. Thus as long as the guard is closed there is no interaction between the cam 35 and the braking mechanism, regardless of angular position of the crankshaft. As the bracket 29 on the flap 30 is substantially coaxial with the pivot 22 there is no interaction between the movement of the guard and the normal operation of the brake by the cylinder 23. As soon as the guard is opened, however, the rod 28 is raised, swinging the flap into the position shown in the drawings with the nose of the pawl 34 in the plane of the cam 35. Even now, as long as the ram or slide 3 of the press is on its upward or return stroke the pawl is not struck because the angular position of the cam is then such that the pawl is clear of the high part, shown at 36. Thus the operator can open the guard as soon as the press starts its upward stroke, and can put his hand in to remove the workpiece without delay. In normal operation the press, which is of the single-stroking type, will come to a halt as soon as the ram or slide reaches the top of its stroke and it will remain there until the operator, after inserting a new workpiece and closing the guard has depressed a pedal or button to start the next stroke. If, through a fault, the press over-runs, that is to say, if it carries on beyond top dead centre and the ram or slide starts to come down again, the nose 37 of the high portion 36 of the cam will strike the follower 34 and swing the flap in a counter-clockwise direction as viewed in FIGURES 1 and 2. It will only move a small distance before a pin 38 (FIGURE 3) on the flap engages a face 39 (FIGURES 2 and 3) on the lever 21 and thereafter the lever and flap will swing together about the pivot 21 and apply the brake with substantial force, bringing the layshaft 12 and hence the crankshaft 7 rapidly to a halt. A microswitch 40 is engaged by the cam follower 34 during its limited movement with respect to the lever and serves to isolate the motor 11 from its current supply by tripping a contactor, to deal with the possibility of the over-running being the result of the failure of the normal interrupting contacts to open.

If the cam 35 were fixed in relation to the crankshaft 7 then alternation of the stroke of the press by rotating the outer eccentric 5 would upset this behaviour in that the nose 37 of the cam would strike the follower 34 well before top dead centre was reached, causing unnecessary operation of the emergency brake, or it would fail to strike it until the ram or slide 3 was already well on its way downwards on an over-run stroke, leading to possible danger. We therefore arrange that the cam 35 is angularly adjustable on the crankshaft 7, being keyed to it by a key 41 (FIGURE 2) which can engage any one of a number of notches 42 in the cam. In the example illustrated there are only three such notches, giving three choices for the angular position of the cam as this is found by experience to give an adequate range of adjustment despite the fact that there are five choices for angular position of the outer eccentric 6.

Besides over-running there is a second possibility of danger, namely that of the crankshaft reaching top dead centre and then through some unforeseen cause, reversing its direction of rotation and causing the ram or slide 3 to descent again. To overcome this possibility we provide a pawl 43 which is pivotally mounted on the lever 21 and urged by a spring 44 into a position in which it bears against the hub of the cam 35. When the crankshaft rotates normally the pawl simply rides over the cam but if the crankshaft starts to run back from the top dead centre position the pawl is almost immediately engaged by the face of a notch 45 that transmits a force via the pawl to the lever 21 to apply the brake.

The pawl 43, while overcoming the danger of reverse running, introduces a complication into the task of releasing the brake after emergency braking following an attempted over-run. After such braking, the brake is held hard on, with the follower 34 engaged by the high part 37 of the cam 35. In order to free the press it is necessary to force the crankshaft back past top dead centre again, against the restraint imposed by the brake, until the high part of the cam is clear of the follower. But this reverse rotation would normally be prevented by the pawl 43 engaging the face 45. We therefore provide an air cylinder 46 of which the piston rod engages an adjustable stop on the tail of the pawl 43 so that, on admission of air to the cylinder 46, the pawl 43 is lifted clear of the cam. At the same time a striker 47 on the pawl 43 engages a microswitch 48 which, either directly or through relays, reverses the connections to the motor 11 to allow the motor to run in the reverse direction and free the brake.

The micro-switch shown at 49 near the left-hand end of the lever 21 is engaged by a striker 50 on that lever when its travel exceeds a pre-determined amount, showing the brake is becoming worn, and the contacts of this microswitch close to illuminate a warning lamp visible to the operator, who can then take up the wear by adjustment of the link 19.

Finally it should be mentioned that although in the example illustrated, which is an example of a geared press, the brake is on a layshift, it will be understood that the brake could be on the crankshaft itself.

I claim:
1. A power-driven mechanically operated press having a stroke which is adjustable by means of a double eccentric or equivalent device and having provisions for braking the crankshaft of the press if the press over-runs or reverse-runs with its guard in the open position, these provisions including a cam synchronised with the rotation of the crank-shaft, in which the timing of this cam with respect to the crankshaft is adjustable.

2. A press according to claim 1 in which the cam carries a part which, when the crankshaft passes top dead centre while the guard is open, strikes a follower that causes application of a brake.

3. A press according to claim 2 in which the follower is mounted on a lever that forms part of a brake-applying linkage and, when engaged by the cam, forces movement of that lever to apply the brake.

4. A press according to claim 3 in which the follower is displaceable with respect to the lever under the action of a linkage connected to the guard in such manner that when the guard is open the follower is in the path of the cam and when the guard is closed it is clear of that path.

5. A power-driven mechanically operated press having a stroke which is adjustable by means of a double eccentric or equivalent device and having provisions for braking the crankshaft of the press if the press over-runs or reverse-runs with its guard in the open position, these provisions including a cam synchronised with the rotation of the crankshaft, in which the timing of this cam with respect to the crankshaft is adjustable and in which the over-running provisions are such that the brake-applying force is derived from the rotation of the crankshaft so that in the event of over-running, subsequent release of the brake requires forcible rotation of the crankshaft in the reverse direction against the restraint of the brake, and further in which means are provided for allowing reversal of the driving power to the press to cause this forcible rotation.

6. A press according to claim 5 which includes provisions for braking the crankshaft both in the event of over-running and in the event of reverse-running and in which means are provided for disengaging the reverse-running provisions to allow the said forcible reverse rotation by the power means.

7. A press according to claim 6 in which the disengagement of the reverse-running provisions is arranged to cause automatic reversal of the driving power.

8. A press according to claim 7 in which the reverse-running provisions comprise a pivoted pawl adapted to be engaged by a face on a part associated with the crankshaft in the event of reverse-running of the latter and to transmit a force to a brake-applying linkage and in which the means for disengaging these provisions comprise a fluid pressure cylinder, operation of which causes the pawl to be pivoted clear of the path of the face.

References Cited

UNITED STATES PATENTS 2,493,495 1/1950 May.
3,022,099 2/1962 Bruscaglioni.

FOREIGN PATENTS 1,286,743 1/1962 France.

CARLTON R. CROYLE, Primary Examiner

ALLAN D. HERRMANN, Assistant Examiner

U.S. Cl. X.R.

74—568; 100—53; 192—144